(12) United States Patent
Garcia-Balleza et al.

(10) Patent No.: US 6,332,749 B1
(45) Date of Patent: Dec. 25, 2001

(54) SYSTEM FOR TORTILLA STACK TRANSFER

(75) Inventors: Silvestre Garcia-Balleza, Atizapan de Zaragoza; Vincente Lojero Perez, Ecatepec; Rafael Meza Loreto, Tlalnepantla, all of (MX)

(73) Assignee: Central Impulsors S.A. de C.V., Santa Fe (MX)

( * ) Notice: Subject to any disclaimer, the term of this patent is extended or adjusted under 35 U.S.C. 154(b) by 0 days.

(21) Appl. No.: 09/408,586

(22) Filed: Sep. 29, 1999

(51) Int. Cl.[7] .................................................. B65G 57/00
(52) U.S. Cl. ..................................... 414/790.6; 198/464.3; 414/907
(58) Field of Search ............................. 198/464.1, 464.3, 198/468.01; 414/790.6, 907

(56) References Cited

U.S. PATENT DOCUMENTS

| | | | |
|---|---|---|---|
| 3,392,853 | * 7/1968 | Mitchell et al. .................. | 414/790.6 |
| 3,525,443 | * 8/1970 | Pomara, Jr. .................... | 414/790.6 X |
| 4,384,813 | * 5/1983 | Smith et al. ................... | 414/790.6 X |
| 4,620,826 | * 11/1986 | Rubio et al. ................... | 414/790.6 X |
| 5,249,492 | * 10/1993 | Brown et al. .................. | 414/790.6 X |
| 5,253,762 | * 10/1993 | Duncan ......................... | 414/790.6 X |
| 5,720,593 | * 2/1998 | Pleake .......................... | 414/790.6 X |

* cited by examiner

*Primary Examiner*—Janice L. Krizek
(74) *Attorney, Agent, or Firm*—Jenkens & Gilchrist, A Professional Corporation

(57) ABSTRACT

A tortilla stack transfer system for moving a plurality of tortilla stacks from a counter-stacker machine to a packaging area comprises a plurality of transfer finger sets, a plurality of transfer stack supports corresponding to the transfer finger sets, a plurality of finger set actuators adapted to move each of the transfer finger sets from a loaded position to an unloaded position, a transfer conveyor located elevationally below the transfer finger sets and carrying a plurality of conveyor blocks, a block position detector, a conveyor position counter, and a processor in electrical communication with the finger set actuators, the block position detector, and the conveyor position counter.

10 Claims, 4 Drawing Sheets

SYSTEM FOR TORTILLA STACK TRANSFER

BACKGROUND OF THE INVENTION

1. Technical Field of the Invention

The present invention relates to systems and methods for packaging tortillas, and more particularly, to systems and methods for the transfer of stacks of tortillas from counting and stacking assembly lines to bagging operation.

2. Description of Related Art

The commercial production of tortillas requires a series of operations which are traditionally accomplished using manual labor, because no machinery has not been designed to take over these tasks. However, as the popularity of the tortilla grows, competitive business conditions mandate the automation of production lines wherever possible, including the automated packing of stacks of tortillas.

After cooking in an oven, several rows or "tracks" of freshly-cooked tortillas enter into a cooling apparatus where the heat from cooking is rapidly removed. At this point, the tortillas are ready for packaging. However, before this is accomplished, the individual tortillas must be gathered together in stacks of preselected sizes for insertion into bags. While there are automated machines to count and stack the tortillas, the individual stacks which result are currently brought to the packaging machinery by means of manual labor. Thus, for example, a four-track counting-stacking production line requires two laborers to remove the stacks of tortillas and place them on a single conveyor line for packaging.

The system of manual labor to transfer tortilla stacks from the counter-stacker apparatus to packaging machinery requires personnel dedicated to this task. Disadvantages include higher work costs, laborer fatigue, and physical contact between the laborers and the tortillas.

The use of manual labor is not entirely without advantages, however. Laborers are able to precisely place the stacks of tortillas on packaging infeed conveyors, facilitating smooth bagging operations. Further, human operators are also able to ensure that the packaging infeed conveyors are filled to capacity, within the limits of the production line. That is, four tracks of tortilla stacks produced by a counter-stacker apparatus can be smoothly transitioned to a single packaging infeed conveyor belt using human operators. Such operators efficiently fill the infeed conveyor with tortilla stacks such that the minimum number of "empty" conveyor belt blocks, or spaces arrive at the packaging apparatus. Therefore, what is needed, is a system and method for tortilla stack transfer which is automated, and provides all of the advantages of human laborers. More particularly, the automated system and method for tortilla stack transfer should operate to lower work costs, reduce the fatigue of manual laborers, and increase the overall cleanliness of tortilla handling operations. Further, the system and method should efficiently transfer stacks of tortillas to the bagger infeed conveyor, such that the maximum number of empty positions on the conveyor are filled, within the limits of the production line supply.

SUMMARY OF THE INVENTION

The counter-stacker structure manages a plurality of tortilla stacks, typically arranged in rows. However, the bagger infeed conveyor requires arranging the stacks into a single row. To solve this problem, the counter-stacker structure is placed in parallel with the tortialla stack transfer system of the present invention so that the rows of tortilla stacks can be transformed into a single row which fills the bagger infeed conveyor.

The tortilla stack transfer system for moving a plurality of tortilla stacks from a counter-stacker machine structure to a packaging area comprises a plurality of transfer stack supports adapted to operate in sliding relationship with a corresponding plurality of transfer finger sets which can be actuated to move from a loaded position, to an unloaded position, and back again. Typically, the stack supports have a curved wall with predefined openings which are penetrated by the transfer finger sets. A transfer conveyor is located beneath the transfer finger sets and carries a plurality of serially-placed conveyor blocks. A block position detector (e.g. a photocell) is adapted to sense the initial position of each one of the blocks as it moves along the transfer conveyor, and a conveyor position counter (e.g. an encoder) provides a movement position signal related to the initial position of each block as it moves from the initial position toward the transfer finger sets.

A processor determines when a particular conveyor block is proximate to one of the transfer finger sets, and commands the loaded finger set to unload a stack of tortillas onto the proximate conveyor block. The conveyor blocks are typically spaced apart from each other on the conveyor according to a preselected distance, which may be approximately equal to the width of the tortilla stacks. The processor is in electrical communication with the finger set actuators, the block position detector, and the conveyor position counter.

The system may include a plurality of compacting discs and actuators; one disc and actuator per transfer stack support. The discs move to compress each tortilla stack against the corresponding transfer finger set as the tortillas are moved off of the transfer finger set onto the selected conveyor block. This gives the stack some additional cohesion which maintains the stack arrangement as it falls onto the selected conveyor block of the moving transfer conveyor.

The invention includes a method of moving a plurality of tortilla stacks from a counter-stacker machine to a packaging area, comprising the steps of receiving a first stack of tortillas above a loading zone, sensing an initial position of a moving conveyor block which passes through the loading zone, sensing the moving position of the conveyor block in relation to the initial position, determining that the block has entered the loading zone, and moving the stack of tortillas onto the conveyor block. Typically, the initial position is located in a fixed spacial relationship with the loading zone, which is located elevationally below each one of the transfer finger sets, and is created when a selected empty conveyor block comes into vertical alignment with the loaded transfer finger set.

Typically, the step of receiving includes loading the stack of tortillas onto a transfer finger set, and the step of moving the stack of tortillas onto the conveyor block includes the step of moving the transfer fingers from a loaded position to an unloaded position. The steps of sensing the initial and moving positions of the conveyor block are usually accomplished using a photocell and encoder, respectively. The photocell detects the initial position of the block, and the encoder provides a number of incremental movement signals which can be counted by the processor and compared with a preselected distance proportional to the spacial relationship between the initial position and the selected loading zone.

Finally, the method of the present invention may include the steps of loading a First-In, First-Out (FIFO) register with the locations of the tortilla stacks as they arrive in the stack supports. Essentially, the tortilla stacks are loaded and unloaded in a first-in, first-out fashion, so that, as the FIFO register is unloaded, the tortilla stacks are also unloaded onto the conveyor blocks in the same order they arrive at the stack supports.

BRIEF DESCRIPTION OF THE DRAWINGS

A more complete understanding of the method and apparatus of the present invention may be acquired by reference to the following detailed description when taken in conjunction with the accompanying drawings, wherein:

FIG. 1A is a perspective view of an alternative transfer stack support (loaded position);

FIG. 1B is a perspective view of an alternative stack support (unloaded position);

DETAILED DESCRIPTION

Figure 1:
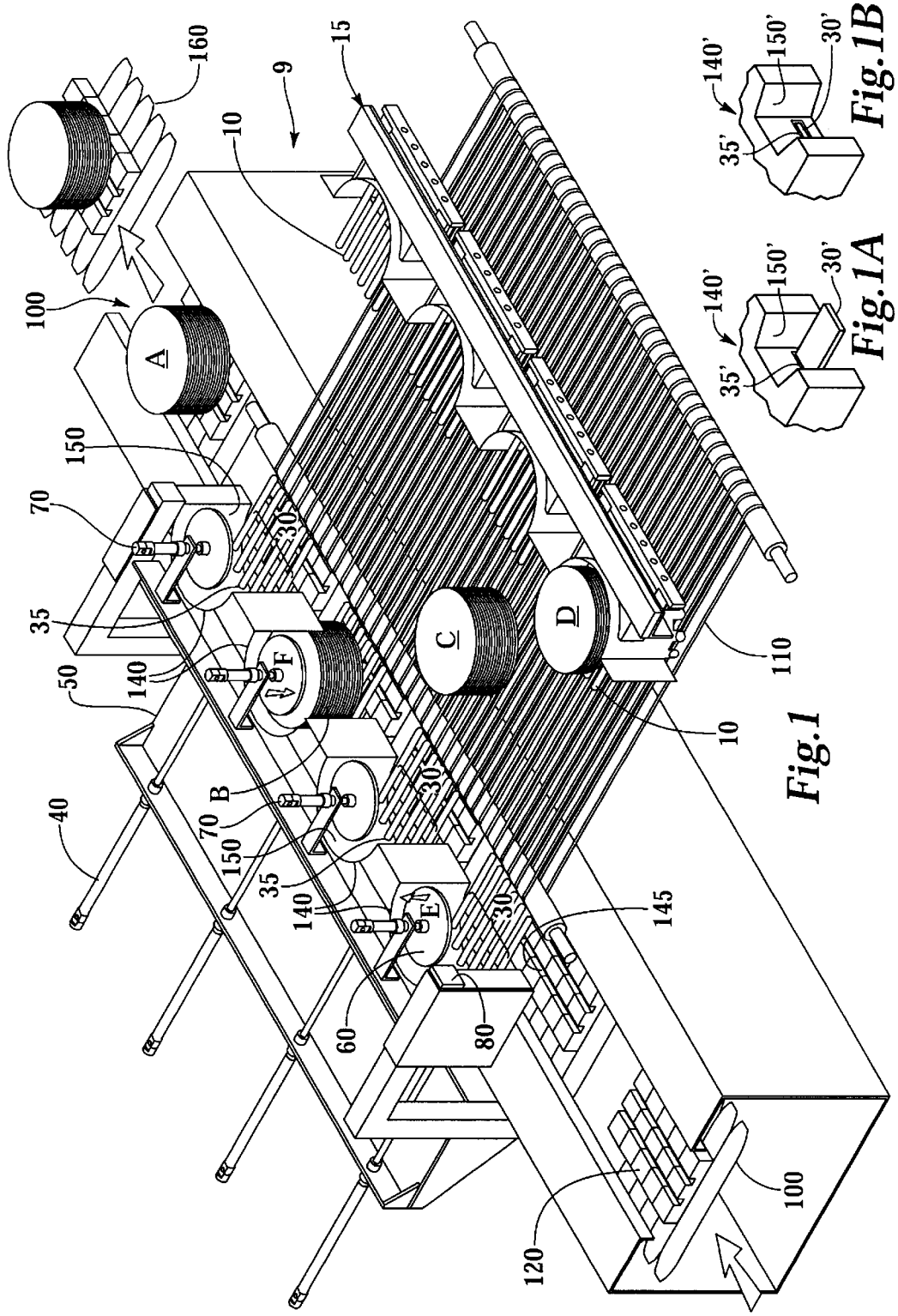
FIG. 1 is a perspective view of the stack transfer system of the present invention.
Figure 2:
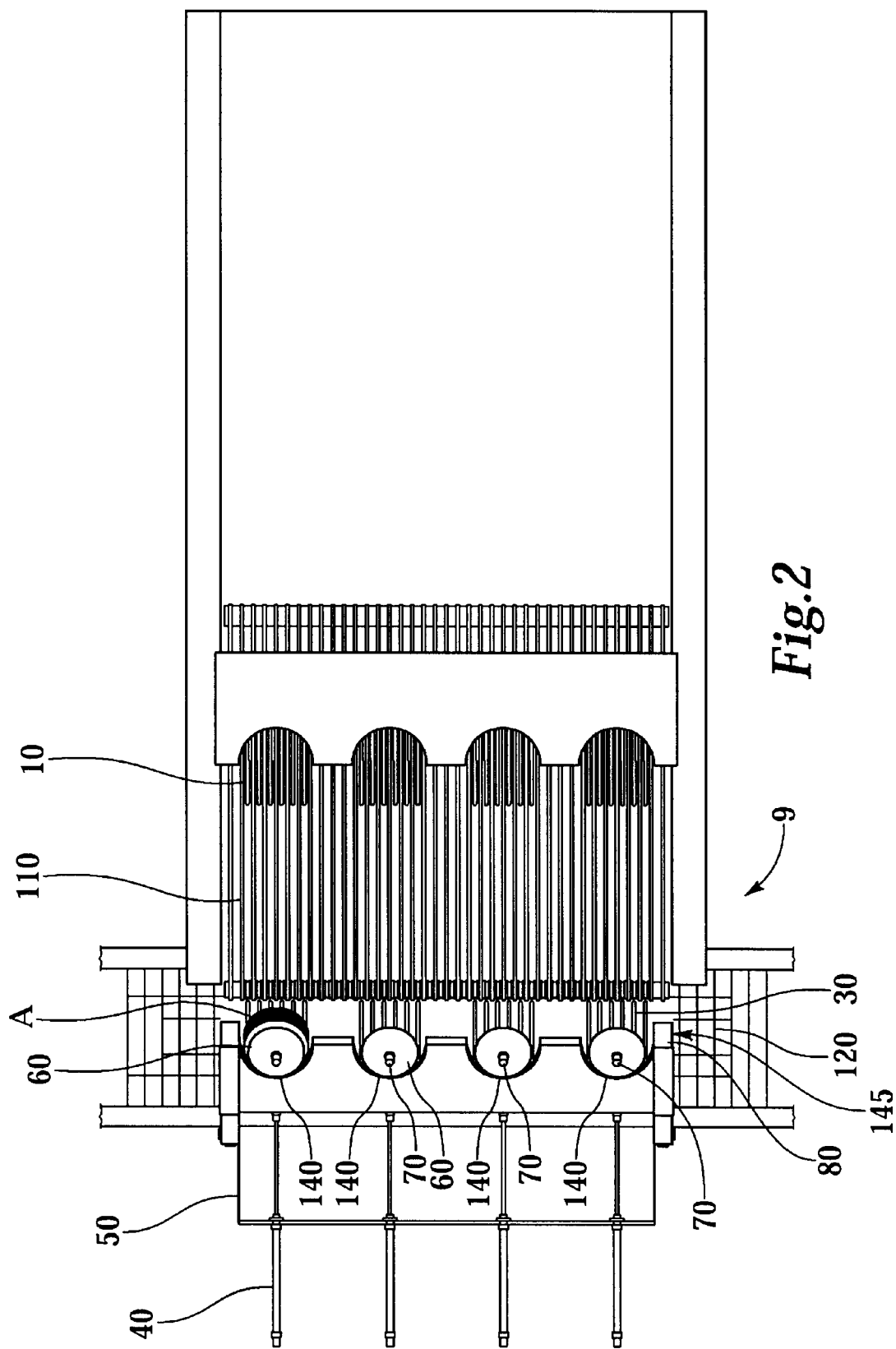
FIG. 2 is a top view of the stack transfer system of the present invention.
Figure 3:
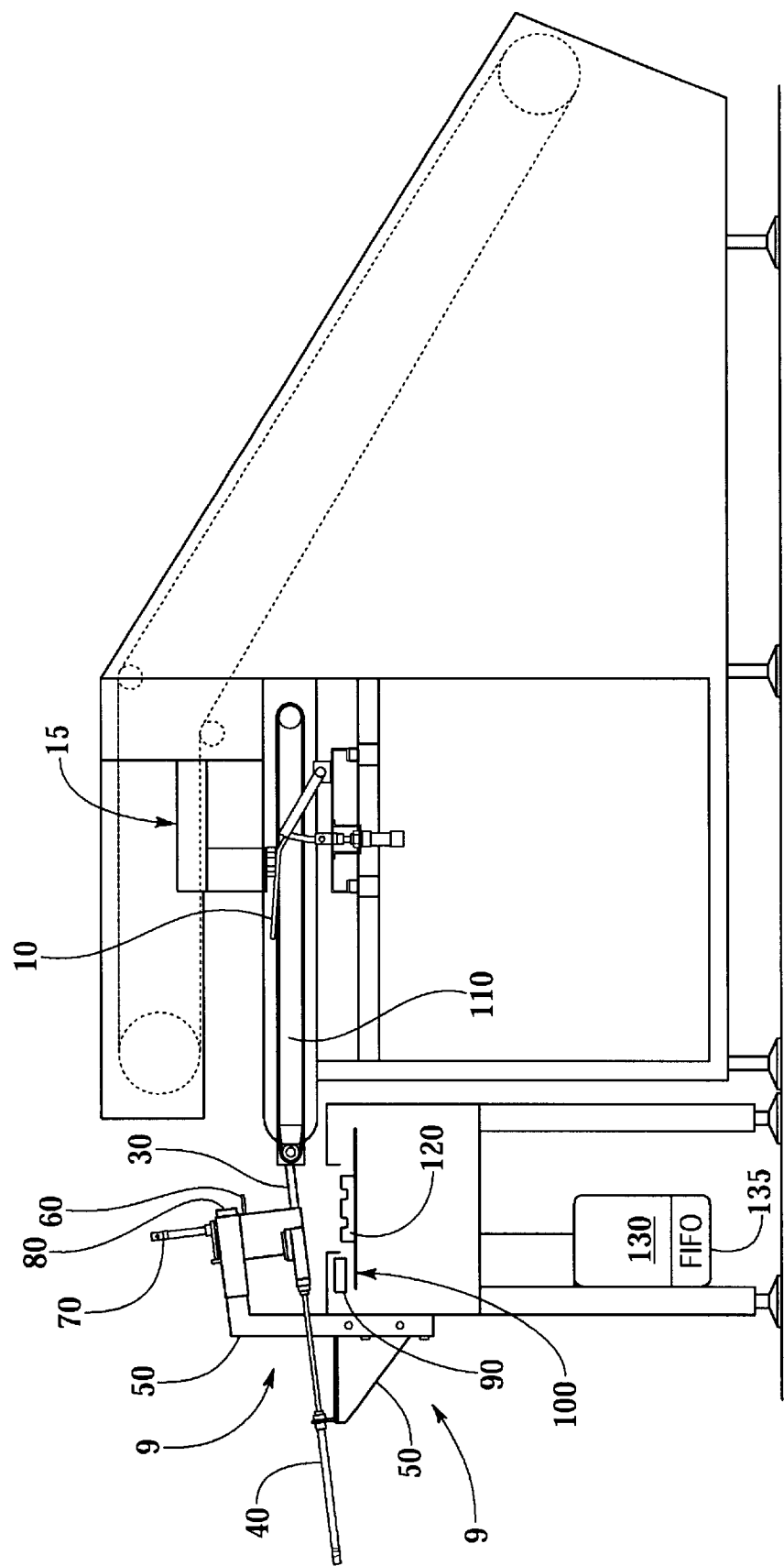
FIG. 3 is a side view of the stack transfer system of the present invention.

Turning now to FIGS. 1, 2, and 3, perspective, top, and side view of the present invention, respectively, can be seen. The tortilla stack transfer system 9 adapted to move a plurality of tortilla stacks A, B, C, and C from a counter-stacker machine structure 15 to a packaging area, entered by a bagger infeed conveyor 160, is most easily appreciated by viewing FIG. 1, the perspective view. The system 9 comprises a plurality of transfer figures sets 30 which correspond to a plurality of transfer stack supports 140. Each one of the transfer finger sets 30 are adapted to operate in sliding relationship with a corresponding, selected transfer stack support 140. The transfer stack supports 140 each have a stack support wall 150 (typically curved), through which a single transfer finger set 30 extends. Thus, a stack support wall 150 may be penetrated by a transfer finger set 30 by way of an opening 35 or series of openings 35. An alternative configuration of the stack support 140 is shown as stack support 140' in FIGS. 1A and 1B. In this case, the transfer finger set 30 is replaced by a single planar element 30' which peirces the stack support wall 150' by way of an opening 35'. The transfer finger set 30, or the planar element 30' operate so as to fulfill the same function.

A series of independently-operable transfer finger set actuators 40 are in mechanical communication with each one of the transfer finger sets 30. Each actuator 40 is adapted to mvoe one of the transfer finger sets 30 from a loaded position, where the transfer finger set 30 is fully extended through the stack support wall 150 into the area surrounded by the stack support 140, 30, or planar element 30' is shown equivalently in FIG. 1B, where the transfer finger set 30 or planar element 30' is fully retracted into the opening 35 or 35'.

The transfer conveyor 100 moves underneath (i.e. is located elevationally below) each of the transfer finger sets 30, and carries, or is attached to, a plurality of conveyor blocks 120. The plurality of conveyor blocks 120 is located on the transfer conveyor according to a selected spacing distance. Typically, the selective spacing distance is approximately equal to the length of a single convey block 120 or a stack of tortillas. The conveyor 100 moves past the transfer stack supports 140 into the packaging area by way of the bagger infeed conveyor 160. The conveyor 100 moves through a series of "loading zones," designated by the space created between the transfer finger sets 30 and the conveyor blocks 120, when these elements enter into vertical alignment as the conveyor 100 moves toward the packaging area.

The system 9 which comprises a transfer structure 50, includes an optional set of compacting discs 60, which are moved by compacting disc actuators 70. The actuators 70, like the actuators 40, may comprise air or fluid operated cylinders, solenoids, motors or other two-position movement devices which are adapted to provide linear positioning capability for the compacting discs 60 and transfer finger sets 30. In use, the compacting discs 60 may move between a non-compacted position to a compacted position, shown by the letters E and F in FIG. 1, respectively.

The system 9 also comprises a processor 130 which is in electrical communication with the plurality of finger set actuators 30, the block position detector 80, and the conveyor position counter 90.

Turning now to FIGS. 1, 2, and 3, the operation of the system of the present invention can be described. The system 9 typically manipulates several stacks of tortillas, in this case, stacks, A, B, C, and D. Typically, the stacks are formed at the stacker-counter structure 15. In FIG. 1, it can be seen that stack D has been formed by the deposition of several tortillas onto a stacker finger set 10. Typical stack size is approximately ten tortillas. The stacker discharge conveyor 110 is in constant motion, and when the stacker-counter structure 15 detects the formation of a completed stack of tortillas, the stacker finger set 10 holding the completed tortilla stack (e.g. stack D) is lowered from a position which is elevationally above the stacker discharger conveyor 110 so that the completed tortilla stack is moved onto the stacker discharge conveyor 110 and onward into a transfer stack support 140. This process can be seen in FIG. 1, wherein the tortilla stack C has been loaded onto the stacker discharge conveyor 110 for receipt by a transfer stack support 140. Tortilla stack B has been moved all the way from the stacker-counter structure 15 to the corresponding transfer stack support 140, where it is ready to be acted upon by the stack transfer system 9.

When one of the transfer finger sets 30 has received a tortilla stack (e.g. stack B), and a loading zone is created by the vertical alignment of the loaded transfer finger set 30 and an empty conveyor block 120, the processor 130 delivers a signal to the corresponding transfer finger set actuator 40 to move the transfer finger set 30 from the loaded position (i.e. shown in FIGS. 1 and 1A) to an unloaded position (shown in FIG. 1B). The system 9 does not determine the existence of a loading zone by actively searching for an empty conveyor block 120. Rather, the appearance of each empty conveyor block 120 on the transfer conveyor 100 is sensed as it enters an initial position 145 by a block position detector 80, which is adapted to sense the initial position 145 of each one of the conveyor blocks 120 as it moves along the transfer conveyor 100. A conveyor position counter 90 is adapted to provide a movement position signal related to the initial position 145 of each of the conveyor blocks 120 so that the processor 130 can detect that any particular conveyor block 120 which has moved past the initial position 145 has now entered into a loading zone elevationally below a loaded set 30 of transfer fingers. A First-In, First-Out (FIFO) register 135 is used to keep track of each of the tortilla stacks as they are received in the corresponding transfer stack supports 140. The appropriate transfer finger set 30 is moved from a loaded position to an unloaded position upon determination by the processor 130 that the movement position signal originated by the conveyor position counter 90 indicates that a selected one of the conveyor blocks 120 is proximate to a selected loaded transfer finger set 30.

For efficient operation, the transfer finger sets 30 are typically grouped into a unit of operation by the processor 130, wherein several units of operation are included within the total number, or plurality, of transfer finger sets 30. For example, a single unit of operation, as illustrated in FIG. 1, may include four transfer finger sets 30, accompanied by four corresponding transfer stack supports 140, and four corresponding transfer finger set actuators 40. As noted above, there may also be included, optionally, four compacting discs 60 with corresponding compacting disc actuators 70. Two, three, or more such units of operation can be controlled by a single processor 130, such that each individual set of transfer fingers 30 and transfer stack supports 140 is seperately monitored and controlled using the single processor 130, a single transfer conveyor 100, a single block position detector 80, and a single conveyor position counter 90. The block position detector 80 may be a photocell or other device capable of sensing the presence of a conveyor block 120 at an initial position typically designated as the entry point to a series of loading zones or the first (i.e. most proximate) transfer stack support 140 at the incoming side of the transfer conveyor 100. The conveyor position counter 90 is typically implemented as an optical encoder, or some other device which is capable of providing a movement position signal to the processor 130 which indicates the movement of the conveyor 100 with respect to the initial position and thus, the entry of a conveyor block 120 into the loading zone beneath any particular transfer finger set 30.

Figure 4:
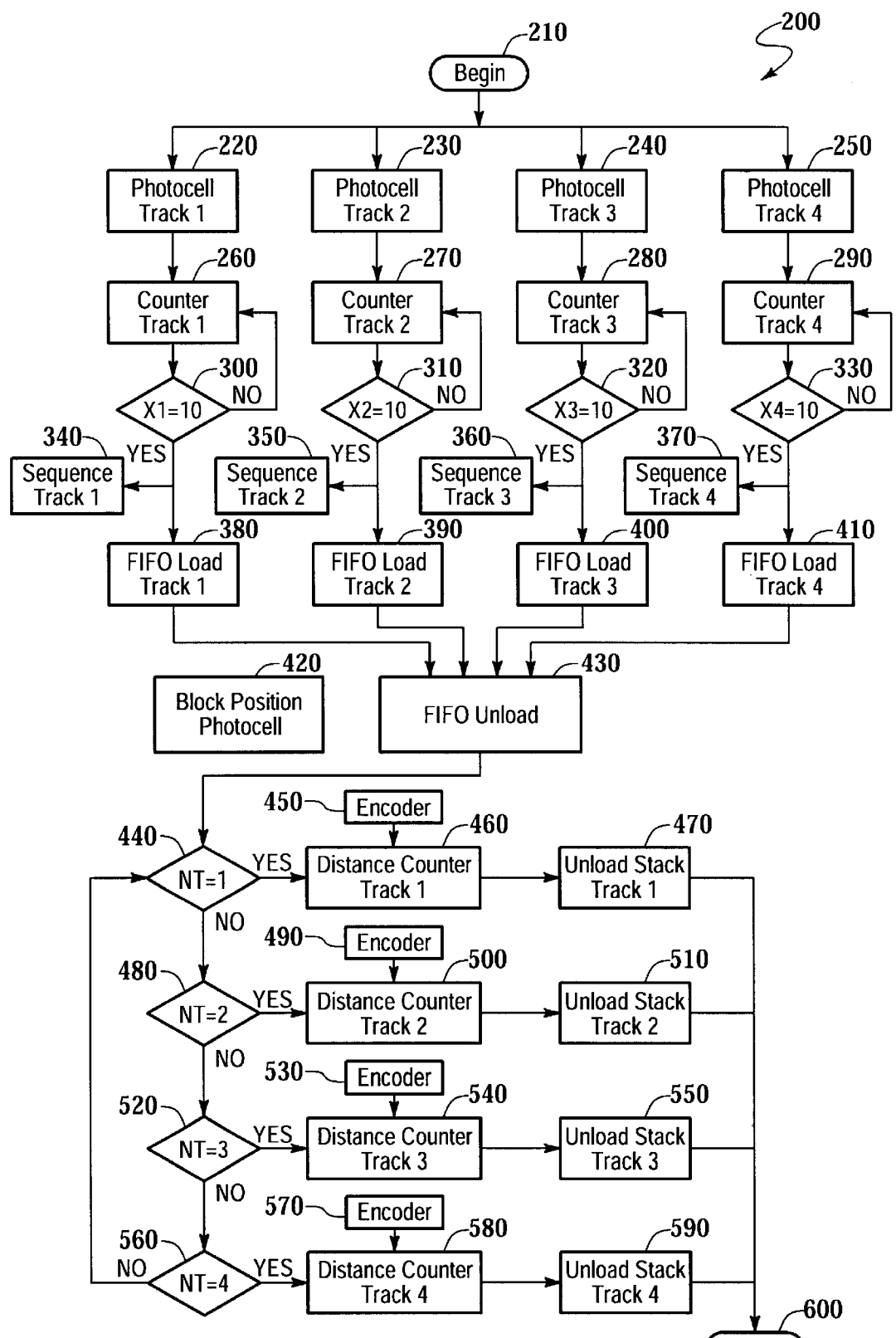
FIG. 4 is a flowchart operational diagram which includes the method of the present invention.

Turning now to FIG. 4, a flowchart 200 which includes the method of the present invention, can be seen. The sequence of steps begins at step 210, with four different monitored tracks, or pathways, for tortilla stack movement from the stacker-counter structure 15 to the transfer structure 50. In the stacker-counter structure 15, there are typically four tracks, corresponding to four sets of stacker finiger sets 10, as shown in FIG. 1. Each track is monitored by a photocell (not shown) in steps 220, 230, 240, and 250 to determine when an individual tortilla has been placed on a particular stack. The formation of each stack is independently monitored with a counter in steps 260, 270, 280, and 290 so that the status of each of the four tortilla stacks can be determined. When any individual stack is complete (e.g. reaches a count of ten), as shown in steps 300, 310, 320, and 330, that individual track is enabled to move the stack from the stacker-counter structure 15 to the transfer structure 50, and more particularly, to the corresponding transfer stack support 140. For example, if tortilla stack D is being monitored in track #1, as shown in FIG. 1, the FIGURE indicates that the counter for track #1 has not yet reached a value of ten, since the stack D is still located on the stacker finger set 10. However, stack C has accumulated the required ten tortillas to make a complete staak, and is therefore being moved to the transfer structure 50 by way of the stacker discharge conveyor 110. This movement corresponds to the sequencing of the individual tracks, as shown in steps 340, 350, 360, and 370.

Upon sequencing any individual track, a First-In, First-Out (FIFO) register 135 is loaded with the number of the track, as shown in steps 380, 390, 400 and 410. The processor 130 monitors the condition of the FIFO register 135 and uses the oldest register value to unload the appropriate station of the transfer structure 50. The FIFO 135 may be included as an integral element of the processor 130 as shown in FIG. 3, or it may comprise a seperate part of the transfer structure 50 in electrical communication with the processor 130.

Unloading of the transfer structure 50 occurs as follows. The block position detector 80 provides a signal to the processor 130 indicating that a particular conveyor block 120 has passed a selected, fixed point known as the initial position 145. Each conveyor block 120 is detected by the block position detector 80 as it passes the initial position 145, and this event is communicated to the processor 130. The oldest stack position recorded in the FIFO 135 is then assigned to the most recent conveyor block 120 to pass the initial position 145. This sequence of events ensures that each conveyor block 120, as it passes the initial position 145, will be efficiently loaded with a complete stack of tortillas (e.g. stack B). Thus, as is shown in FIG. 1, the next conveyor block to pass the initial position 145 will be assigned to tortilla stack B.

The detection process for the block position detector 80 occurs in step 420, and the selection of the track or station to unload is made in step 430. Depending on the stack to be unloaded, corresponding to NT 1, 2, 3, or 4, as shown in steps 440, 480, 520, and 560, a counter within the processor 130 determines the distance traveled by the conveyor block 120 which has been assigned to the loaded transfer structure 50 station. The conveyor position counter 90, or encoder, at steps 450, 490, 530, and 570 provides a series of movement increment signals to the processor 130. Each of the increment signals corresponds to a preselected incremental distance traveled by a selected block 120 between the initial position 145 and the loading zone beneath the particular transfer finger set 30 which is to be unloaded. The processor 130 compares the number of movement increment signals provided by the conveyor position counter 90 with a preselected number or value which is directly proportional to the distance or fixed spacial relationship between the initial position 145 and the selected loading zone, as shown in steps 460, 500, 540 and 580. Thus, if the encoder increment corresponds to a distance of 0.5 inches, and the initial position is 50.0 inches from the approximate loading zone position which comes into being as the selected conveyor block 120 moves directly beneath the stack of tortillas which is to be unloaded, then the processor 130 will count and compare the number of movement increment signals provided by the conveyor position counter 90 to the numeric value "100" before moving the stack of tortillas onto the selected conveyor block 120 by moving the transfer finger set 30 from the loaded position to the unloaded position, as shown in FIGS. 1A and 1B. Thus, the FIFO 135 is unloaded at step 430 with the numbder of the track or transfer stack support 140 which has been loaded for the greatest length of time. Then, the conveyor position counter 90 or encoder is monitored by the processor 130 to determine the time at which the number of movement increment signals provided by the counter 90 is equal to the preselected number corresponding to the selected distance from the initial position to the selected loading zone, located elevationally below the transfer finger set 30 which is to be unloaded. Then, when the appropriate distance has been indicated as being reached by the conveyor position counter 90, the tortilla stack is unloaded onto the conveyor block 120 in steps 470, 510, 550, and 590 by moving the corresponding set of transfer fingers 30 from a loaded position to an unloaded position, as shown in FIGS. 1A and 1B. Typically, this ends the process of step 600. However, the process usually continues by moving the selected transfer finger set 30 from the unloaded position back to a loaded position for receipt of the next stack of tortillas. Each of the transfer finger sets 0 is unloaded in the same order as the FIFO register 135, according to the preselected order of arrival at the corresponding stack supports 140. Thus, using the processor 130 and the FIFO 135, the order of arrival at each stack support 140, corresponding to a particular tortilla stack location, dictates the movement of selected tortilla stacks from the stack support 140 onto selected conveyor blocks 120 in accord with the preselected order of arrival. The FIFO 135 is loaded and unloaded according to this order of arrival. Second and subsequent stacks of tortillas are also moved onto other conveyor blocks 120 selected from the plurality of blocks 120 according to the arrival order of the stacks, and the corresponding order of FIFO register 135 loading.

As noted above, the presence and operation of compacting discs 60 and compacting disc actuators 70 is optional However, if the discs 60 and actuators 70 are present, they may be used to compress or compact the stacks of tortillas on to the transfer finger sets 30 immediately after they are received from the stacker discharge conveyor 110. Thus, the actuators 70 are adapted to move each one of the compacting discs 60 from a non-compacted position to a compacted position after receipt of the tortilla stack at a particular transfer stack support 140. After unloading the transfer finger set 30, the respective actuator 70 moves the compacting disc 60 to the non-compacted position.

Although preferred embodiments of the method and apparatus of the present invention have been illustrated in the accompanying Drawings and described in the foregoing Detailed Description, it will be understood that the invention is not limited to the embodiments disclosed, but is capable to numerous rearrangements, modifications and substitutions without departing from the scope of the invention as set forth and defined by the following claims.

What is claimed is:

1. A tortilla stack transfer system for moving a plurality of tortilla stacks from a counter-stacker machine to a packaging area, comprising:

a plurality of transfer finger sets;

a plurality of transfer stack supports in a one-to-one correspondence with the plurality of transfer finger sets, wherein each one of the plurality of transfer finger sets is adapted to operate in sliding relationship with respect to a respective one of the plurality of transfer stack supports;

a plurality of finger set actuators in mechanical communication with the transfer finger sets, wherein each one of the plurality of actuators is adapted to move a selected one of the transfer finger sets from a loaded position to an unloaded position;

a transfer conveyor located elevationally below the plurality of transfer finger sets, said conveyor having a plurality of conveyor blocks;

a block position detector adapted to sense an initial position of each one of said conveyor blocks along the transfer conveyor;

a conveyor position counter adapted to provide a movement position signal related to the initial position of each one of the conveyor blocks; and a processor in electrical communication with the plurality of finger set actuators, the block position detector, and the conveyor position counter.

2. The system of claim 1, wherein the processor delivers a signal to a selected one of the finger set actuators to thereby move the corresponding selected one of the plurality of transfer finger sets from the loaded position to the unloaded position upon determining that the movement position signal indicates that a selected one of the conveyor blocks is proximate to the selected one of the plurality of transfer finger sets.

3. The system of claim 1, wherein each one of the stack supports has a stack support wall.

4. The system of claim 3, wherein each one of the stack support walls is curved.

5. The system of claim 3, wherein each one of the stack support walls has predefined openings, each of said openings being penetrable by a respective one of the plurality of transfer finger sets.

6. The system of claim 1, wherein the plurality of conveyor blocks is located on the transfer conveyor according to a selected spacing distance.

7. The system of claim 1, further comprising:

a plurality of compacting discs; and a plurality of compacting disc actuators, wherein each one of the actuators is adapted to move a selected one of the compacting discs from a noncompacted position to a compacted position.

8. The system of claim 1, wherein a preselected number of transfer finger sets are grouped into a unit of operation by the processor, and wherein more than one of said units of operation are included within the plurality of transfer finger sets.

9. The system of claim 1, wherein the block position detector is a photocell.

10. The system of claim 1, wherein the conveyor position counter is an encoder.

* * * * *

UNITED STATES PATENT AND TRADEMARK OFFICE
CERTIFICATE OF CORRECTION

PATENT NO.    : 6,332,749 B1
DATED         : December 25, 2001
INVENTOR(S)   : Garcia-Balleza et al.

It is certified that error appears in the above-identified patent and that said Letters Patent is hereby corrected as shown below:

Column 1,
Line 67, replace "tortialla" with -- tortilla --

Column 3,
Line 32, replace "A, B, C, and C" with -- A, B, C, and D --
Line 36, replace "figures" with -- fingers --
Line 47, replace "peirces" with -- pierces --
Line 54, replace "mvoe" with -- move --
Line 57, after "stack support 140," add -- as is shown in Figs. 1 and 2 and equivalently in Fig. 1A. The unloaded position of the transfer finger set --

Column 4,
Line 10, after "The" add -- compacting disc --
Line 11, after "the" add -- transfer finger set --

Column 5,
Line 20, replace "seperately" with -- separately --
Line 41, replace "finiger" with -- finger --
Line 58, replace "staak" with -- stack --

Column 6,
Line 3, replace "separate" with -- separate --
Line 52, replace "numbder" with -- number --

Signed and Sealed this

Sixth Day of August, 2002

Attest:

JAMES E. ROGAN
Attesting Officer    Director of the United States Patent and Trademark Office